US008047008B2

(12) United States Patent
Lebegue et al.

(10) Patent No.: US 8,047,008 B2
(45) Date of Patent: Nov. 1, 2011

(54) REPLACEABLE ORIFICE FOR COMBUSTION TUNING AND RELATED METHOD

(75) Inventors: Jeffrey Lebegue, Simpsonville, SC (US); Neal W. Grooms, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 789 days.

(21) Appl. No.: 12/078,390

(22) Filed: Mar. 31, 2008

(65) Prior Publication Data

US 2009/0241553 A1 Oct. 1, 2009

(51) Int. Cl.
*F02C 7/20* (2006.01)
*F02G 3/00* (2006.01)

(52) U.S. Cl. ............................... 60/798; 60/752; 60/755

(58) Field of Classification Search .............. 60/39, 752, 60/755–760, 800, 39.23, 52, 798; 285/224, 285/299; 431/352; 29/402, 888, 889, 890; 228/125; 361/807
See application file for complete search history.

(56) References Cited

U.S. PATENT DOCUMENTS

| | | | | |
|---|---|---|---|---|
| 2,549,818 | A * | 4/1951 | Joy | 92/194 |
| 3,345,723 | A * | 10/1967 | Stilla et al. | 29/898.07 |
| 4,500,030 | A * | 2/1985 | Gerber et al. | 228/125 |
| 4,916,577 | A * | 4/1990 | Dawkins | 361/807 |
| 5,150,778 | A * | 9/1992 | Wolbers et al. | 192/98 |
| 6,250,618 | B1 * | 6/2001 | Greenhill | 267/162 |
| 6,499,993 | B2 * | 12/2002 | Steber et al. | 431/352 |
| 7,373,772 | B2 * | 5/2008 | Simons et al. | 60/39.37 |

FOREIGN PATENT DOCUMENTS

FR 2747276 A1 * 10/1997

* cited by examiner

*Primary Examiner* — Ehud Gartenberg
*Assistant Examiner* — Arun Goyal
(74) *Attorney, Agent, or Firm* — Nixon & Vanderhye, P.C.

(57) ABSTRACT

A combustor assembly having a transition piece and at least one orifice assembly in the transition piece, the orifice assembly comprising: a boss having an outside periphery and an inside periphery, the inside periphery including an annular seat and an upstanding flange formed with an annular, inwardly facing retaining ring groove, the boss fixed within an opening in the transition piece; an orifice plate having a bottom surface that is adapted to be received on the annular seat; and a retaining ring located in the retaining ring groove and at least partially engaged with the orifice plate.

4 Claims, 3 Drawing Sheets

REPLACEABLE ORIFICE FOR COMBUSTION TUNING AND RELATED METHOD

This invention relates to gas turbine combustion technology and, more specifically, to an insert for transition piece air dilution holes that facilitates the use of changeable orifice plates for adjusting the flow of air into the transition piece.

BACKGROUND OF THE INVENTION

Current dry low $NO_x$ combustion systems require tuning to achieve correct combustor temperatures. This is achieved in some instances by means of air dilution holes provided in the transition piece extending between the turbine and the first combustor stage. The air flowing through the holes serves as bypass and dilution air, but occasionally needs to be adjusted after turbine commissioning in the field. The current designs utilizing simple dilution holes require a lengthy and costly down time so that the transition pieces can be removed and resized. Specifically, the transition pieces must be stripped of their thermal barrier coating, patch welded, machined to add new holes, heat treated and recoated with the thermal barrier coating. In U.S. Pat. No. 6,499,993, owned by the assignee of this invention, there is provided a mechanical arrangement enabling external access to the combustion chamber which facilitates changeover of combustor dilution-hole areas to adjust the $NO_x$ levels without disassembly of the combustors. More specifically, the assembly is provided with a boss, an orifice plate, and a retaining ring. The retaining ring is tapered, and in cooperation with a matching taper in the ring grooves, provide a wedging method for holding the orifice plate tightly in place. The boss design does not, however, have a flexible-weld distortion tolerant feature, which can lead to distortion of the undesirable distortion in the boss hole and orifice plate dimensions.

BRIEF DESCRIPTION OF THE INVENTION

In one exemplary and non-limiting aspect of this invention, there is provided a combustor assembly having a transition piece and at least one orifice assembly in the transition piece, the orifice assembly comprising: a boss having an outside periphery and an inside periphery, the inside periphery including an annular seat and an upstanding flange formed with an annular, inwardly facing retaining ring groove, the boss fixed within an opening in the transition piece; an orifice plate having a bottom surface that is adapted to be received on the annular seat; and a retaining ring located in the retaining ring groove and at least partially engaged with the orifice plate.

In another aspect, the invention relates to a boss and orifice plate assembly comprising an annular boss adapted to be secured in a hole formed in a combustor component, the boss formed with an annular seat supporting a replaceable orifice plate, and an annular retaining ring groove adjacent the seat, the seat extending radially inwardly of the annular retaining ring groove; and a wave spring seated in the groove and at least partially and resiliently engaged between a surface of the groove and a surface of the orifice plate.

In still another aspect, a method of adjusting the size of dilution air holes in a turbine combustor component comprising: (a) inserting a boss into a dilution air hole having a first diameter and welding the boss in place; (b) locating an orifice plate on an annular seat formed in the boss, the orifice plate having a center hole formed with a second diameter smaller than the first diameter; and (c) securing a retaining ring in a groove in the boss, in overlying and at least partially engaging relationship with the orifice plate, wherein the retaining ring resiliently braces the orifice plate against the seat.

The invention will now be described in connection with the drawings identified below.

DETAILED DESCRIPTION OF THE INVENTION

Figure 1:
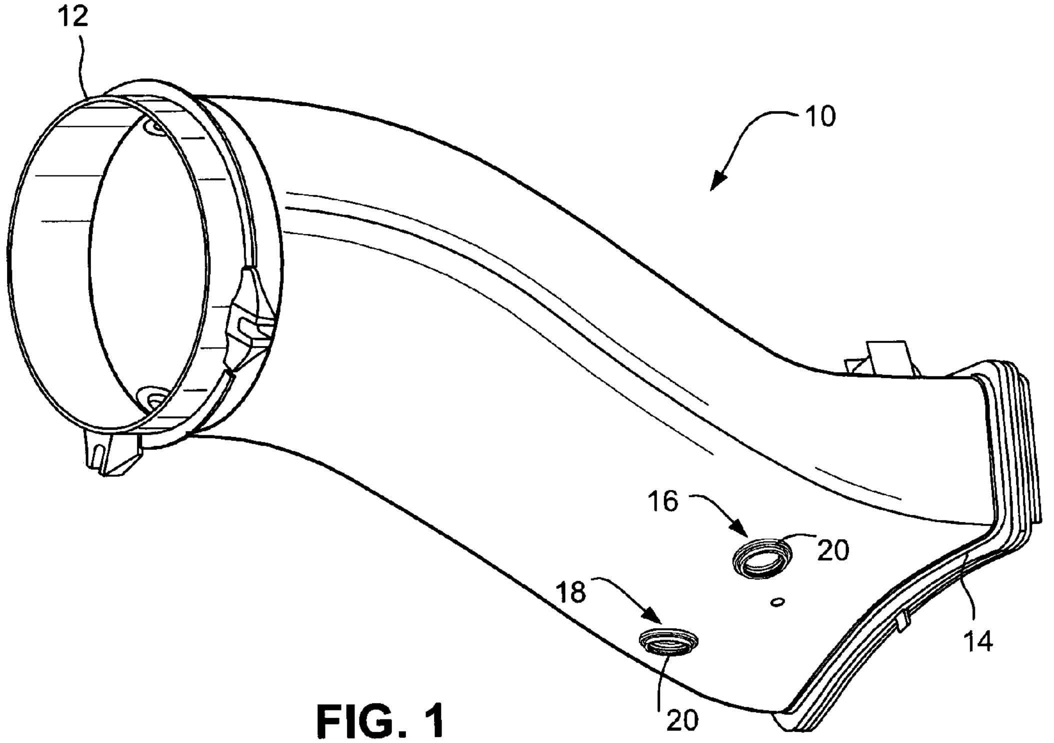
FIG. 1 is a perspective view of a turbine transition piece having replaceable orifice plate in accordance with a non-limiting, exemplary embodiment of the invention.

Referring to FIG. 1, a gas turbine transition piece 10 is designed to connect to a turbine combustor (not shown) at an upstream end 12 and to the first turbine stage (not shown) at an opposite downstream end 14. At various predetermined locations along the transition piece 10, dilution flow holes are provided for flowing compressor discharge air into the combustion system in a combustor tuning process to achieve correct combustor temperatures. For purposes of this disclosure, two locations indicated by reference numerals 16 and 18, have been designated as locations where a new orifice plate boss 20 may be welded in place to facilitate the tuning process. This is not to be interpreted, however, to mean that these are the only dilution holes present, or that the new orifice plate boss can only be used in these locations.

Figure 2:
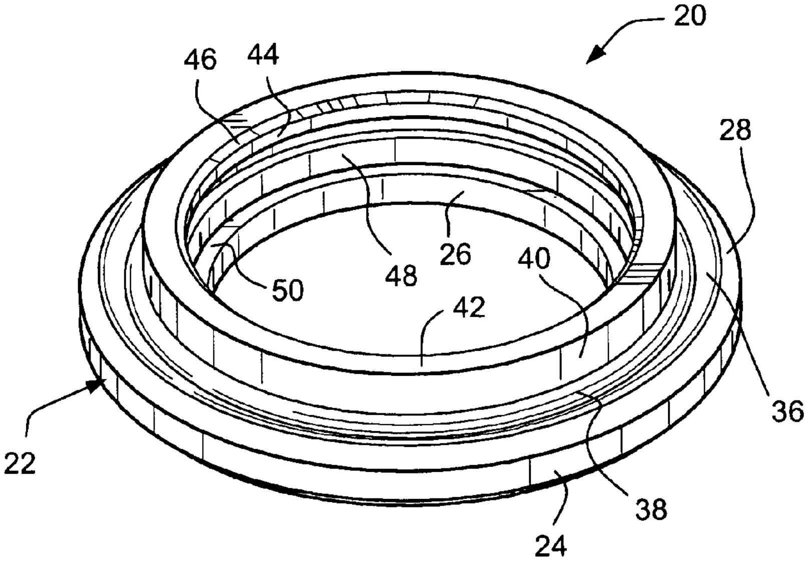
FIG. 2 is a perspective view of a boss employed in FIG. 1 to hold a replaceable orifice plate.
Figure 3:
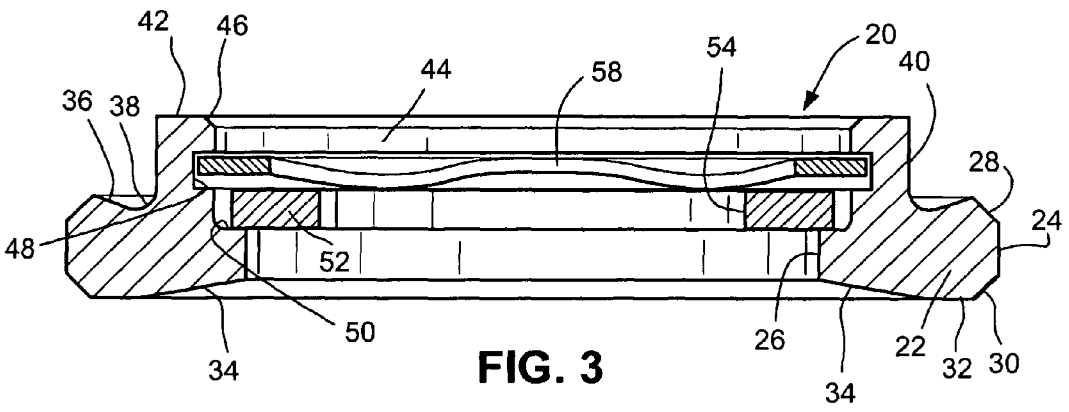
FIG. 3 is a cross section through the boss in FIG. 2, but with an orifice plate and retaining ring installed.
Figure 6:
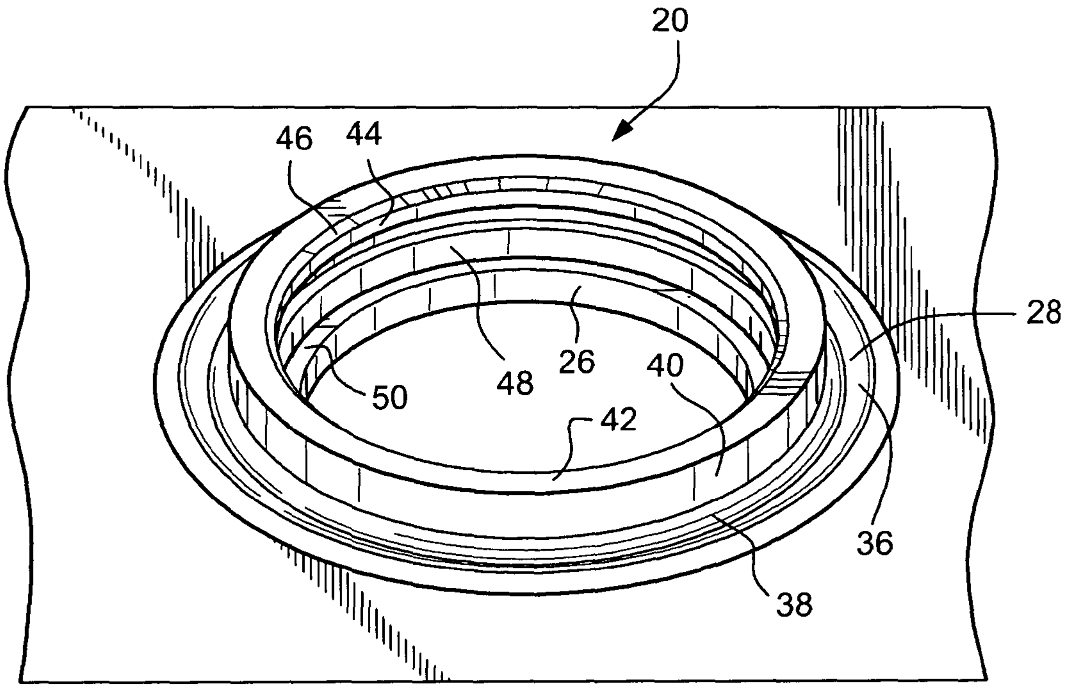
FIG. 6 is a more detailed perspective view of the boss shown in FIG. 2 installed in a transition piece.

FIGS. 2, 3 and 6 illustrate the annular boss 20, preferably constructed of Nimonic 263 alloy material. A base portion 22 of the boss defines an OD surface (or outside periphery) 24 and an ID surface (or inside periphery) 26 that are substantially parallel. Using FIGS. 2 and 3 as references for orientation purposes, the surfaces 24 and 26 are substantially vertical, with surface 24 chamfered at opposite ends 28, 30. Chamfer 30 connects to the lower base surface 32 that is formed in part by an upwardly tapered surface 34 that joins with the ID surface 26.

The upper chamfer 28 joins to a radially inwardly tapered annular surface (or groove) 36 that, in turn, joins to an annular radiused corner 38 from which an upstanding, generally cylindrical wall or flange 40 extends upwardly, terminating at an annular flat top surface 42. An internal wall 44 is formed with an upper chamfer 46, an annular retaining ring groove 48, and a radially inwardly extending shoulder or seat 50 that joins with the ID surface 26.

Seat 50 is adapted to receive and support an annular and substantially planar orifice plate 52, preformed with a center hole 54 that defines the new diameter for the dilution hole, Plate 52 may be constructed of Hastalloy X (or other suitable) material with a substantially uniform thickness in the exemplary but non-limiting embodiment of 0.125 inch.

The annular orifice plate 52 is held in place by an annular, undulated retaining ring 58, i.e., the ring is formed as a wave spring, with undulations in the peripheral or circumferential direction. The groove 48 is sized, in conjunction with the selected thickness of the orifice plate 52, such that when the retaining ring is forced into the groove 48, it exerts a downward force on the orifice plate 52 of, for example, 35 lbs., sufficient to hold the plate in place during operation of the turbine. Note in this regard that the retaining ring 58 has a greater diameter than the orifice plate, and thus the groove 48 has a greater diameter than the seat 50.

At the same time, the arrangement of the groove 48 and seat 52 in an upstanding center portion of the boss substantially isolates the groove shape and dimensions from any distortion that might otherwise be caused by welding the boss into a dilution hole, e.g., hole 16, in the transition piece. In other words, the upstanding portion of the boss is able to flex during welding without permanent distortion, and thus, post-weld machining of the groove 48 and seat 52 is not necessary.

Figure 5:
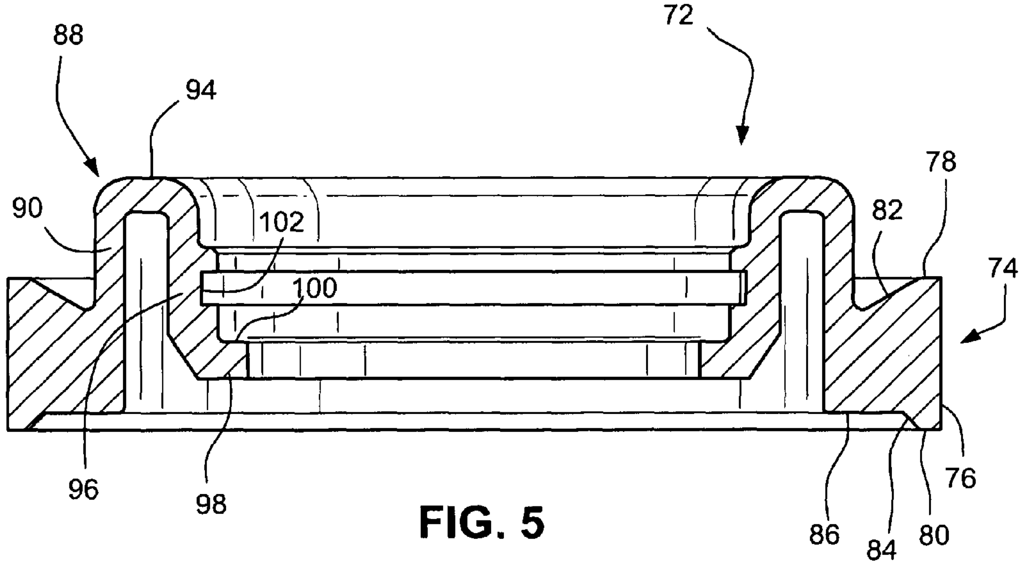
FIG. 5 is a cross section through a boss in accordance with yet another non-limiting exemplary embodiment.

In a variation of the above boss design, the OD surface 24 may be made substantially vertical along its entire height (eliminating the chamfers 28, 30 similar to the OD surface 76 in FIG. 5), with chamfers formed instead, on the surface defining the TP hole(s). It is understood that the chamfers on the OD surface of the boss, or alternatively, on the edges of the holes in the transition piece, facilitate the use of full penetration welds to fix the boss to the transition piece. In this case, the thickness of the base portion of the boss would exceed the thickness of the transition piece. This is helpful in that the transition piece is formed of a complex shape, and the thicker boss may be machined after welding to blend smoothly with the TP surface, leaving no "sunken" edges that could give rise to unwanted stresses.

Figure 4:
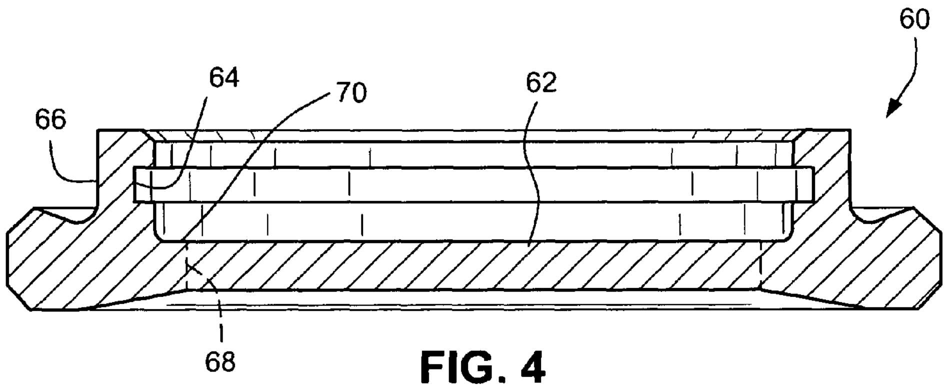
FIG. 4 is a cross section taken through a boss in accordance with another non-limiting exemplary embodiment.

FIG. 4 illustrates a boss 60 similar to boss 20, but with a solid center portion 62. With the retaining ring groove 64 machined into the upstanding portion 66 of the boss, the boss may be welded in place in a dilution hole in the TP. Thereafter, the solid center portion is removed along the circular dotted line 68, leaving a seat 70 for the orifice plate. Leaving the center portion 62 in place during welding helps maintain the correct, round orientation of both the groove 64 and resulting seat 70.

FIG. 5 illustrates an alternative boss design intended to even further isolate the retaining ring groove and orifice plate seat from welding stresses. In this embodiment, the boss 72 includes a base portion 74 having a substantially vertical OD surface or edge 76 that joins to top and bottom surfaces 78, 80, respectively. Top surface 78 merges with an inwardly and downwardly angled surface (or groove) 82, while lower surface 80 joins to an inwardly and upwardly angled surface 84 that joins with a horizontal bottom surface 86.

A substantially inverted U-shaped loop 88 is joined to the base portion 74. Specifically, a first outer vertical wall 90 extends upwardly from the base portion 74 and, via horizontal top surface 94, reverses direction to form an inner vertical wall 96 that extends downwardly from the top surface 94 to a radially inwardly turned free end 98. The radially inner side of the wall 96 is machined to incorporate the shoulder or seat 100 for supporting the orifice plate (not shown in FIG. 5) as well as the retaining ring groove 102 in a manner similar to that described above in connection with FIGS. 3 and 4. Here, however, the inverted loop 88 serves to further isolate the snap ring groove 102 and orifice plate seat 100 from welding distortion.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustor assembly having a transition piece and at least one orifice assembly in said transition piece, the orifice assembly comprising:

a boss having an outside periphery and an inside periphery, said inside periphery including an annular, radially inwardly extending seat and an upstanding flange formed with an annular, inwardly facing retaining ring groove, the boss fixed within an opening in the transition piece;

an annular, substantially planar orifice plate having a substantially uniform thickness, a center hole and a bottom surface that is adapted to be received on said annular seat, and a retaining ring in the form of a wave spring having an undulating peripheral surface located in said retaining ring groove 48 and at least partially engaged with said orifice plate 32 to thereby press said orifice plate against said seat.

2. The combustor assembly of claim 1 wherein said outside periphery includes a substantially vertical surface chamfered at opposite ends.

3. The combustor assembly of claim 1 wherein said annular retaining ring groove has a diameter greater than a diameter of the seat.

4. The combustor assembly of claim 2 wherein an annular groove extends radially between, said upstanding flange and said substantially vertical surface.

* * * * *